Patented Oct. 31, 1950

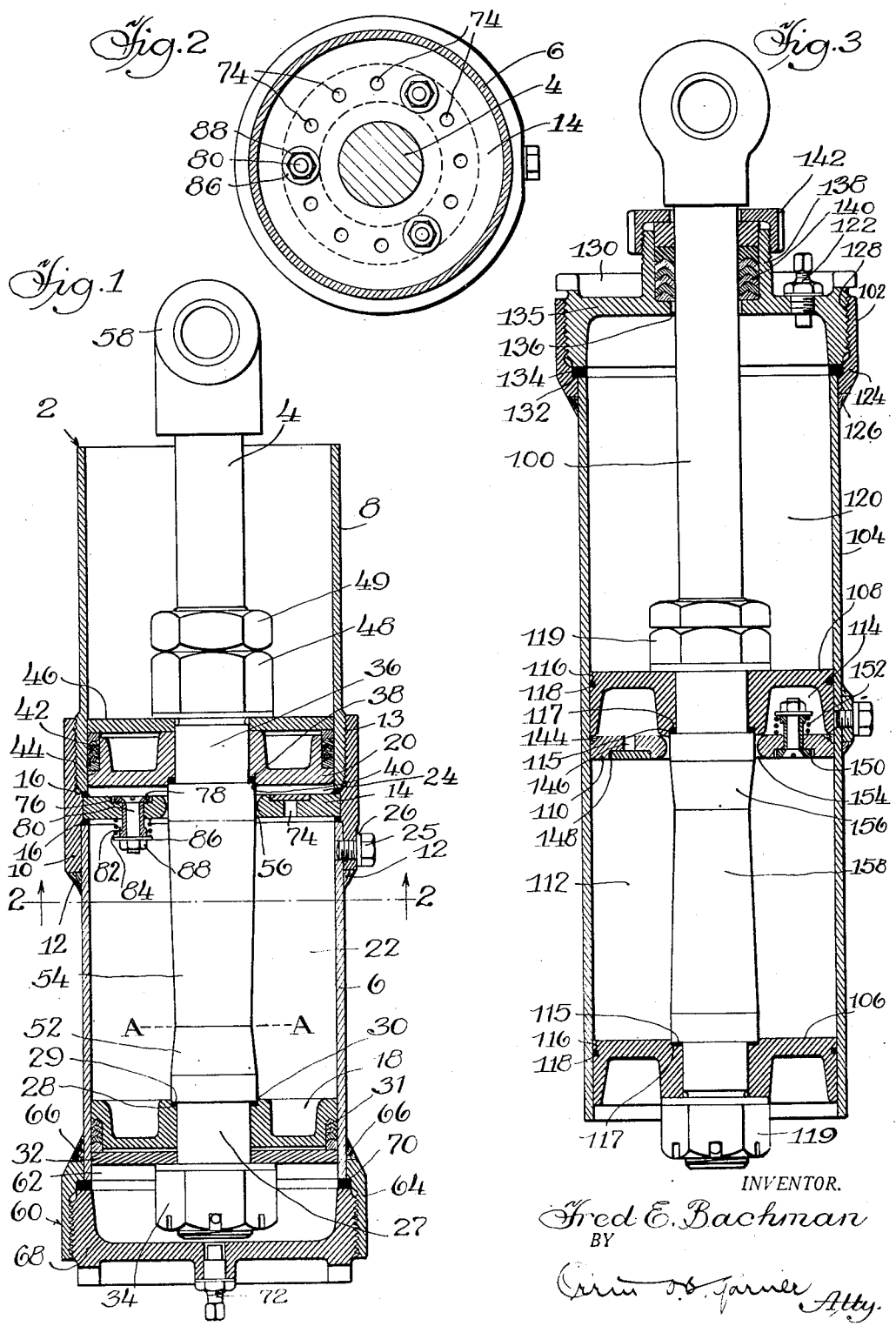

2,527,980

UNITED STATES PATENT OFFICE 2,527,980

SHOCK ABSORBER

Fred E. Bachman, Chicago, Ill., assignor to American Steel Foundries, Chicago, Ill., a corporation of New Jersey Application July 31, 1944, Serial No. 547,479

2 Claims. (Cl. 267—64)

My invention relates to shock absorbing devices and more particularly to shock absorbers of the return oleo type.

The general object of my invention is to provide novel shock absorbing devices of the type in which shocks or impacts are damped by a liquid metering action between two relatively movable members and wherein a gas under pressure forms a resilient connection between the members and is adapted to be further compressed by the movement of the members under impact to cushion the shock and to return the members to their initial relative positions following the shock.

A specific object of my invention is the provision of novel shock absorbing devices comprising a pair of relatively movable members, namely, a cylinder and a piston rod having spaced pistons reciprocally mounted in said cylinder, said cylinder having an end wall adjacent one of said pistons for providing a deformable reservoir containing a gas under pressure and also having a wall or baffle plate between said pistons providing spaced deformable liquid chambers, said plate having an opening therein through which the rod passes and defining therewith a metering orifice whereby movement of the piston assembly relative to the cylinder in one direction causes pressure on the liquid in one chamber by the associated piston effecting a slow transference of the liquid from the chamber to the other chamber for damping the impact stroke and further compressing the gas, said wall having a non-return valve therein providing an additional passage communicating with the chambers whereby expansion of the compressed gas causes movement of the piston assembly relative to said cylinder in an opposite direction and the slow passage of the liquid through the passage and orifice in the plate effecting a damping action on the rebound stroke of the device.

In one modification of the invention, the spring means afforded by the gas under pressure in the cylinder resiliently sustains the load carried by the device after a predetermined amount of compression of the device has occurred and also serves as an elastic restoring force for returning the device to its extended position under load following absorption of the impact by the device. In another modification of the invention, the spring means resiliently opposes extension of the device by elements respectively connected to the piston rod and cylinder and movable away from each other and also restores the piston assembly and cylinder to their initial relative positions following absorption of the impact by the device.

In the drawings, Figure 1 is a longitudinal sectional view, partly in elevation, of a device embodying the invention, showing the same in compressed position. Figure 2 is a horizontal view taken on the line 2—2 of Figure 1.

Figure 3 is a view similar to Figure 1, showing a modified construction in compressed position.

Referring to the drawings and more particularly to the device shown in Figures 1 and 2, said device comprises a cylinder 2 and a metering pin or piston rod 4 reciprocal therein.

The cylinder 2 is formed in two aligned sections 6 and 8 connected together by a sleeve 10 in telescoping engagement with the adjacent end portions of the same. The end face of the sleeve 10 is welded to the section 6, as indicated at 12, and a portion of the inner surface of the sleeve is in threaded engagement with the section 8 as at 13.

Interposed between the sections 6 and 8 and engaging the sleeve 10 is the cylinder wall or partition forming a baffle plate 14 having a packing 16 on opposite sides thereof compressed between the same and the sections 6 and 8 to form a fluid-tight connection between the sections and sleeve and to hold the plate in position in the cylinder.

The piston rod 4 passes through a central opening in the baffle plate 14 and is provided with a pair of spaced pistons 18 and 20 slidably engaging the inner surface of the sections 6 and 8, respectively. The baffle plate is positioned between the pistons 18 and 20 and defines with the pistons 18 and 20 spaced deformable liquid chambers 22 and 24 within the cylinder 2. The cylinder 2 and sleeve 10 may be provided with aligned openings for the admission of an hydraulic liquid into the chamber 22, said openings being closed by a threaded plug 25, carrying a resilient washer 26 for preventing escape of the liquid from the chamber 22.

The piston 18 is mounted on the end portion 27 of the rod 4 within the cylinder, and the hub portion of said pistons defines with said rod an annular recess 28 receiving therewithin a packing 29 in engagement with a shoulder 30 of the end portion 27. The skirt of the piston 18 is formed with a peripheral recessed portion receiving an elastic packing gland 31. The packing 29 and the gland 31 are urged into tight engagement with the shoulder 30 and the inner surface of the cylinder 2, respectively, by a packing gland ring 32, surrounding the piston rod and engaging the gland 31, and a nut 34 in threaded engagement with the end of the rod 4 and bearing against the ring 32. The piston 20 is similarly mounted on a reduced central portion 36 of the rod 4, said rod having a packing 38 interposed between a shoulder 40 thereof and the piston and said piston having a packing gland 42 interposed between a shoulder 44 thereof and a packing gland ring 46, the ring 46 engaging the hub portion of the piston and the packing gland 42 and being urged thereagainst by a nut 48 having threaded engagement with the rod 4 to compress the packing 38 and the gland 42 into tight engagement with the shoulder 40 and the inner surface of the cylinder, respectively. A lock nut 49 may be provided for preventing the rotation of the nut 48.

The portion of the piston rod 4 between the pistons 18 and 20 is of varying diameter comprising a tapered surface 52 and a tapered surface 54 converging toward the horizontal plane indicated by the line A—A in Figure 1, said portion passing through the central opening of the baffle plate 14 during relative movement of the cylinder and piston rod and defining therewith a metering orifice 56 for effecting the gradual transference of a portion of the liquid in the chamber 24 to the chamber 22 upon the compression stroke of the device whereby a primary damping action is afforded between the same for absorbing shocks transmitted thereto by associated members connected to the bracket 58 of the rod 4 and to the cylinder head or wall 60, and whose relative movements are to be cushioned.

The one end of the cylinder 2 is closed by a cylinder head 60 for defining with the piston 18 an air chamber 62 within the cylinder, said head comprising a sleeve 64 engaging the cylinder end and welded thereto as indicated at 66 and an interior threaded surface for receiving a hollow cap or plug 68. A packing 70 is compressed between the ends of the cylinder and the plug for preventing the escape of compressed air forced into the chamber through a valve 72 mounted in the plug.

The compressed air in the chamber 62 functions to resiliently sustain the normal static load placed upon the device after a predetermined amount of compression of the device has occurred and also serves as an elastic restoring force for returning the device to its normal load position after absorption of a shock by the device.

In addition, the compressed air within the chamber 62 assists in dampening the rebound stroke of the device as it tends to force the piston 18 and the associated piston rod 4 and piston 20 continually toward the open end of the cylinder, and by so doing, causes the transference of the liquid in the chamber 22 through the metering orifice 56 and through an additional valve-controlled passage in the plate 14 to the chamber 24 causing spring controlled but lesser damping action for effecting accelerated extension or rebound stroke of the device. For this purpose, the baffle plate 14 is provided with valve means for permitting the controlled return of the liquid in the chamber 22 to the chamber 24 during the extension or rebound stroke of the device, affording a lesser and secondary damping action while preventing the transference of the liquid in the chamber 24 to the chamber 22 other than through the metering orifice 56 during the compression or impact stroke of the device. The valve means for effecting these results comprises a series of openings 74, circularly arranged in the baffle plate 14 and extending therethrough into an annular recess 76 of the baffle plate 14. A ring 78 is held within the recess 76 by three bolt and nut assemblies having resilient means sleeved thereon for maintaining the ring in the recess. More particularly, the bolts 80 extend through aligned openings in the ring and baffle plate and also through sleeves 82 fitting within the openings in the baffle plate and engaging the ring. A coil spring 84 surrounds each sleeve 82 and is compressed between the baffle plate and a washer 86 upon engagement of the nut 88 with the threaded end of the bolt 80.

Referring to Figure 1, it will be apparent that movement of the piston 18 toward the baffle plate 14 by the compressed air in the chamber 62 will cause sufficient pressure to be imparted to the liquid in the chamber 22 to urge the ring 78 outwardly of the baffle plate against the resistance of the springs 84, thus allowing the flow of the liquid in the chamber 22 through the openings 74 in the baffle plate and into the chamber 24, as well as through the metering orifice 56, to effect a lesser and secondary damping action on the rebound stroke of the device. It may also be noted that during compression of the device under load or impact, movement of the rod 4 into the cylinder 2 will cause pressure to be exerted on the liquid in the chamber 24 by the piston 20, and the ring 78 will be urged into the recess 76 of the baffle plate to prevent passage of the liquid from the chamber 24 through the openings 74 in the baffle plate to the chamber 22, said liquid being forced through the metering orifice 56 into the chamber 22.

To illustrate the operation of the device, it will be assumed that the device is operatively interposed between the chassis of a vehicle and one of the wheels thereof so as to transmit to said wheel a predetermined gravitational load constituting part of the weight of the vehicle. In such case the load will cause the piston rod 4 to move inwardly of the cylinder 2, resulting in the graduated and restricted passage of the fluid in the chamber 24 through the metering orifice 56 to the chamber 22 until the air in the chamber 62 is sufficiently compressed to support the entire load on the device.

When the vehicle travels along a smooth road, the shock absorber is under normal static condition and the load is resiliently supported on the compressed air within the device. When the wheel strikes and rides over a bump, the chassis of the vehicle will tend to follow its original course with the result that the shock absorber will be shortened and the piston rod 4 will be moved inwardly of the cylinder 2, causing the compressed air in the chamber 62 to be further compressed by the piston 18 and the liquid in the chamber 24 will flow under pressure imparted thereto by the piston 20 through the constricted metering orifice 56 into the chamber 22 for effecting a primary damping action on the relative movement of the rod and cylinder. During the rebound stroke of the device, a secondary damping action will occur by the liquid in the chamber 22 passing into the chamber 24 through the openings 74 in the baffle plate and the orifice 56, such respective damping actions being continued until the pressure of the compressed air in the chamber 62 recovers its normal static load supporting condition. When the wheel falls into a depression in the road surface, the shock absorber will be rapidly lengthened and the piston rod will be moved outwardly of the cylinder 2 by the expansion of the compressed air in the chamber 62 urging the piston 18 and the associated piston rod 4 and piston 20 toward the open end of the cylinder 2. The pressure exerted by the piston 18 on the liquid in the chamber 22 will cause the ring 78 to be moved outwardly of the recess 76 of the baffle member to permit the flow of the liquid through the metering orifice 56 and openings 74 of the baffle plate and into the chamber 24. The resistance of liquid transference within the shock absorber will naturally be less on the extension stroke but rapidly reassumes the original value during the compression stroke as the ring 78 closes the openings 74 in the baffle plate, thus preventing the escape of liquid therethrough, with the consequent flow of the liquid from the chamber 24 through the orifice 56 into the chamber 22 to effect a damping action on the relative movement of the piston assembly and cylinder and consequent restoration to closely graduated resistance of liquid transference upon the resumption of the normal static load on the device.

It will be apparent that the load carried by the shock absorber will be resiliently supported by the air spring formed by the compressed air in the chamber 62, and relative movement of the cylinder and piston assembly will be damped by liquid flow between the chambers 24 and 22 and to a lesser extent by liquid flow from chamber 22 to chamber 24 during the operation of the device.

The modification shown in Figure 3 differs from the construction shown in Figure 1 by affording a primary damping action upon the extension stroke of the device and a lesser and secondary damping action upon the compression stroke of the device. Also, the modification differs therefrom by the provision of an air spring affording a resilient connection between two associated members, attached to the piston rod and the cylinder, respectively, and having movement away from each other. To this end, the metering pin or rod 100 passes through a cylinder head 102 into the cylinder 104. The piston rod 100 is provided with a pair of spaced pistons 106 and 108 affording with the cylinder wall or baffle plate 110, positioned therebetween, a pair of spaced deformable liquid chambers 112 and 114 in the cylinder. The pistons 106 and 108 are provided with annular recesses 115 and 116, respectively receiving the packings 117 and 118, urged into tight engagement with the rod 100 and the cylinder by nuts 119 for preventing the escape of liquid between the piston hub portions and the rod 100 and between the piston skirts and the inner surface of the cylinder.

The cylinder head 102 and the piston 108 define with the cylinder 104 an air chamber 120 therewithin for containing compressed air admitted through a valve 122 in the cylinder head and providing an air spring upon the extension stroke of the device. The cylinder head 102 through which the piston rod 100 passes comprises a sleeve 124 fitted over an end of the cylinder and welded thereto as indicated at 126. A portion of the inner surface of the sleeve is in threaded engagement as at 128 with a hollow cap or plug 130. A packing 132 is seated on the end face of the cylinder and a shoulder 134 of the sleeve to form an airtight joint upon engagement of the packing by the end face of the plug 130. The wall 135 of the plug is formed with an opening 136 through which the piston rod 100 extends into the cylinder and also with a tubular portion 138 on one side thereof for receiving a packing gland 140 seated on the wall of the plug and urged into engagement with the rod 100 by a gland nut 142 threaded on the portion 138 to prevent air escaping from the chamber 120.

The baffle plate 110 is fixed in the cylinder 104 by a weld 144. The baffle plate incorporates a valve means similar to those previously described comprising a series of openings 146 extending through the baffle plate into an annular recess 148, having a ring 150 held therein by the compression of the springs 152 between the plate and the associated nut and bolt assemblies. It may be noted that the ring 150 will prevent the passage of the fluid in the chamber 112 through the openings 146 into the chamber 114 whereby extension of the device will cause the liquid to be gradually transferred through the metering orifice 154 defined by the central opening in the baffle plate and the tapered surfaces 156 and 158 of the piston rod 100 to afford a primary damping action during extension of the device. Upon compression of the device, the piston rod will be moved inwardly of the cylinder 104 whereby the fluid in the chamber 114 will be placed under pressure by the piston 108, causing the ring 150 to be lifted out of the annular recess 148 by the fluid pressure to allow the flow of the liquid through the openings 146 and the orifice 154 into the chamber 112 to thereby effect a secondary damping action with accelerated inward movement of the piston.

In the modification just described, it will be apparent that when the device is connected between a pair of members tending to move away from each other, the device will be extended to compress the air in the air chamber to effect a resilient connection between the members and also the flow of the liquid between the chambers 112 and 114 will damp relative movement of the members during the impact and with lesser dampening on the rebound stroke of the device, the compression of the air upon the extension of the device under impact tending to compress the device to return the members to their original positions for a following shock.

It is to be understoood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. An hydraulic shock absorber comprising a cylinder having one end thereof open to the atmosphere, the other end of said cylinder being closed against communication with the atmosphere, a partition intermediate the ends of said cylinder, fixed thereto, and dividing the cylinder into spaced chambers, a passage through said partition, a tapered plunger reciprocal within said cylinder and extending into said passage to define a metering orifice therewith, spaced pistons fixed to said plunger at opposite sides of said partition, said chambers being adapted to contain a body of hydraulic fluid confined between said pistons and metered through said orifice on one stroke of said absorber, said orifice being the sole means for metering said fluid on said one stroke of said absorber one-way, bypass valve means in said partition adapted to accommodate substantially unmetered flow of said fluid between said chambers on the other stroke of said absorber, a spring consisting of a body of compressible gas confined between one of said pistons and the closed end of said cylinder, said gas being the sole spring means for resisting said one stroke of said absorber by compression between said one piston and the closed end of said cylinder, and said gas being adapted to actuate said absorber on said other stroke thereof, and a slidable fluid tight seal between each piston and said cylinder whereby said fluid is positively spaced at all times from the atmosphere and from said gas to prevent dissolving of the latter in said fluid and to prevent chemical reaction between said gas and said fluid.

2. An hydraulic shock strut comprising a cylinder having one end thereof open to the atmosphere, the other end of said cylinder being closed against communication with the atmosphere, a partition fixed to said cylinder intermediate the ends thereof and dividing the cylinder into spaced chambers, a passage through said partition centrally thereof, a tapered plunger reciprocal within said cylinder and extending through said passage to define a metering orifice therewith, spaced pistons carried by said plunger at opposite sides of said partition, said chambers being adapted to contain a body of hydraulic fluid confined between said pistons and metered through said orifice on one stroke of said plunger, said orifice being the sole means for metering said fluid on said one stroke of said plunger one-way, by-pass valve means in said partition adapted to accommodate unmetered flow of said fluid between said chambers on the other stroke of said plunger, said valve means comprising a plurality of ports around said passage and adapted to interconnect said chambers, an annular valve plate at the side of said partition facing the open end of said cylinder, and spring means carried by said partition for yieldingly urging said plate to closed position over said ports, a spring consisting of a body of compressible gas confined between one of said pistons and the closed end of said cylinder, said gas being the sole spring means for resisting said one stroke of said plunger and being adapted to actuate said plunger on said other stroke thereof, and a slidable fluid tight seal between each piston and said cylinder whereby said fluid is spaced at all times from the atmosphere and from said gas to prevent dissolving of the latter in said fluid and to prevent chemical reaction between said gas and said fluid.

FRED E. BACHMAN.

REFERENCES CITED

The following references are of record in the file of this patent:

UNITED STATES PATENTS

| Number | Name | Date |
|---|---|---|
| 1,759,674 | Wallace | May 20, 1930 |
| 1,886,712 | Messier | Nov. 8, 1932 |
| 1,956,669 | Charles | May 1, 1934 |
| 2,248,865 | Griepenstroh | July 8, 1941 |
| 2,364,865 | Mattingly | Dec. 12, 1944 |
| 2,395,595 | Underwood | Feb. 26, 1946 |
| 2,404,111 | Underwood | July 16, 1946 |

FOREIGN PATENTS

| Number | Country | Date |
|---|---|---|
| 244,332 | Great Britain | Dec. 17, 1925 |
| 751,475 | France | June 19, 1933 |